United States Patent
Leko et al.

(10) Patent No.: US 10,259,528 B1
(45) Date of Patent: Apr. 16, 2019

(54) BICYCLE SHOE/PEDAL SYSTEM

(71) Applicants: Frank M. Leko, Safety Harbor, FL (US); Mike C. Lohmeyer, Safety Harbor, FL (US)

(72) Inventors: Frank M. Leko, Safety Harbor, FL (US); Mike C. Lohmeyer, Safety Harbor, FL (US)

( * ) Notice: Subject to any disclaimer, the term of this patent is extended or adjusted under 35 U.S.C. 154(b) by 0 days.

(21) Appl. No.: 16/055,931

(22) Filed: Aug. 6, 2018

Related U.S. Application Data

(60) Provisional application No. 62/542,025, filed on Aug. 7, 2017.

(51) Int. Cl.
*B62M 3/08* (2006.01)
*A43B 5/14* (2006.01)

(52) U.S. Cl.
CPC .............. *B62M 3/086* (2013.01); *A43B 5/14* (2013.01)

(58) Field of Classification Search
CPC ................................. B62M 3/086; A43B 5/14
See application file for complete search history.

(56) References Cited

U.S. PATENT DOCUMENTS

| | | | | |
|---|---|---|---|---|
| 589,443 | A | * 9/1897 | Rathbun | A43C 15/161 36/59 R |
| 4,538,480 | A | * 9/1985 | Trindle | A43B 5/14 24/697.1 |
| 4,907,469 | A | * 3/1990 | Gobbi | A43B 5/14 36/131 |
| 9,609,905 | B1 | * 4/2017 | Leko | B62M 3/086 |
| 2004/0040411 | A1 | * 3/2004 | Harrington | A43B 5/14 74/594.6 |

FOREIGN PATENT DOCUMENTS

| | | | |
|---|---|---|---|
| DE | 3431935 A1 | * 3/1986 | ............... A43B 5/14 |
| DE | 19904114 A1 | * 8/2000 | ............... A43B 5/14 |
| FR | 2624470 A1 | * 6/1989 | ............... A43B 5/14 |
| WO | WO-2013077912 A1 | * 5/2013 | ............... A43B 5/14 |

* cited by examiner

*Primary Examiner* — Vicky A Johnson

(57) ABSTRACT

A generally cylindrical sleeve is slidably received on a generally cylindrical shaft for rotation there around. A base plate with cleat bolts attaches a cleat to a shoe sole. The cleat has a projection extending downwardly and a recess in a generally C-shaped configuration with an opening facing forwardly to removably receive the sleeve. A securement tongue has a leading end and a trailing end. Tongue bolts attach the leading end to the base plate of the cleat forwardly. The trailing end is a free linear edge extending rearwardly and upwardly to contact the shaft in the recess.

6 Claims, 5 Drawing Sheets

BICYCLE SHOE/PEDAL SYSTEM

BACKGROUND OF THE INVENTION

Related Application

The present invention is based upon Provisional Application Ser. No. 62/542,025 filed Aug. 7, 2017, the subject matter of which is incorporated herein by reference. It is an improvement over our prior invention disclosed and claimed in U.S. Pat. No. 9,609,905 issued Apr. 4, 2017.

Field of the Invention

The present invention relates to a bicycle shoe/pedal system for use with a conventional bicycle and conventional bicycle shoes and more particularly pertains to removably coupling a shoe of a user to a pedal of a bicycle and to minimizing time and accuracy needed for re-coupling the shoe to the pedal after a stop. The removable coupling and the re-coupling are done in a safe, convenient, and economical manner.

DESCRIPTION OF THE PRIOR ART

The use of bicycle shoe/pedal systems of known designs and configurations is known in the prior art. More specifically, bicycle shoe/pedal systems of known designs and configurations previously devised and utilized for the purpose of coupling a shoe to a bicycle pedal are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a bicycle shoe/pedal system that allows for use with a conventional bicycle and conventional bicycle shoes and more particularly pertains to removably coupling a shoe of a user to a pedal of a bicycle and to minimizing time and accuracy needed for re-coupling the shoe to the pedal after a stop. The removable coupling and the re-coupling are done in a safe, convenient, and economical manner.

In this respect, the bicycle shoe/pedal system according to the present invention substantially departs from the conventional concepts and designs of the prior art, and in doing so provides an apparatus primarily developed for use with a conventional bicycle and conventional bicycle shoes and more particularly pertains to removably coupling a shoe of a user to a pedal of a bicycle and to minimizing time and accuracy needed for re-coupling the shoe to the pedal after a stop. The removable coupling and the re-coupling are done in a safe, convenient, and economical manner.

Therefore, it can be appreciated that there exists a continuing need for a new and improved bicycle shoe/pedal system which can be used with a conventional bicycle and conventional bicycle shoes and more particularly pertains to removably coupling a shoe of a user to a pedal of a bicycle and to minimizing time and accuracy needed for re-coupling the shoe to the pedal after a stop. The removable coupling and the re-coupling are done in a safe, convenient, and economical manner. In this regard, the present invention substantially fulfills this need.

SUMMARY OF THE INVENTION

In view of the disadvantages inherent in the known types of bicycle shoe/pedal systems of known designs and configurations now present in the prior art, the present invention provides an improved bicycle shoe/pedal system. As such, the general purpose of the present invention, which will be described subsequently in greater detail, is to provide a new and improved bicycle shoe/pedal system and method which has all the advantages of the prior art and none of the disadvantages.

To attain this, from a broad context, the present invention essentially comprises a bicycle shoe/pedal system. First provided is a shaft having a generally cylindrical configuration. Next provided is a sleeve having a generally cylindrical configuration. The sleeve is slidably received on the shaft for rotation there around. Next a cleat is provided. A base plate with cleat bolts attaches the cleat to a shoe sole. The cleat has a projection extending downwardly and a recess in a generally C-shaped configuration with an opening facing forwardly to removably receive the sleeve. Lastly, a securement tongue with a leading end and a trailing end is provided. Tongue bolts attach the leading end to the base plate of the cleat forwardly. The trailing end is a free linear edge extending rearwardly and upwardly to contact the shaft in the recess. Such components are individually configured and correlated with respect to each other so as to attain the desired objective.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including such equivalent constructions insofar as they do not depart from the spirit and scope of the present invention.

It is therefore an object of the present invention to provide a new and improved bicycle shoe/pedal system which has all of the advantages of the prior art bicycle shoe/pedal systems of known designs and configurations of known designs and configurations and none of the disadvantages.

It is another object of the present invention to provide a new and improved bicycle shoe/pedal system which may be easily and efficiently manufactured and marketed.

It is a further object of the present invention to provide a new and improved bicycle shoe/pedal system which is of durable and reliable constructions.

An even further object of the present invention is to provide a new and improved bicycle shoe/pedal system which is susceptible of a low cost of manufacture with regard to both materials and labor, and which accordingly is then susceptible of low prices of sale to the consuming public, thereby making such bicycle shoe/pedal system economically available to the buying public.

Lastly, it is another object of the present invention is to provide a bicycle shoe/pedal system which can be used with a conventional bicycle and conventional shoe shoes and more particularly pertains to removably coupling a shoe of a user to a pedal of a bicycle and to minimizing time and accuracy needed for re-coupling the shoe to the pedal after a stop.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
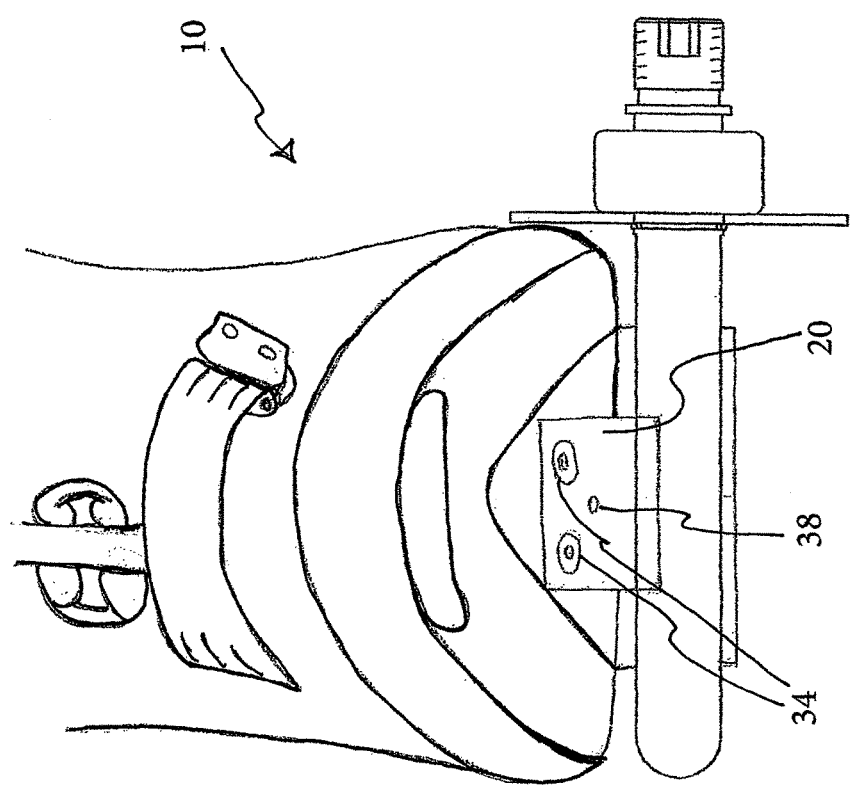
FIG. 1 is a front elevational view of a bicycle shoe/pedal system constructed in accordance with the principles of the present invention.
Figure 2:
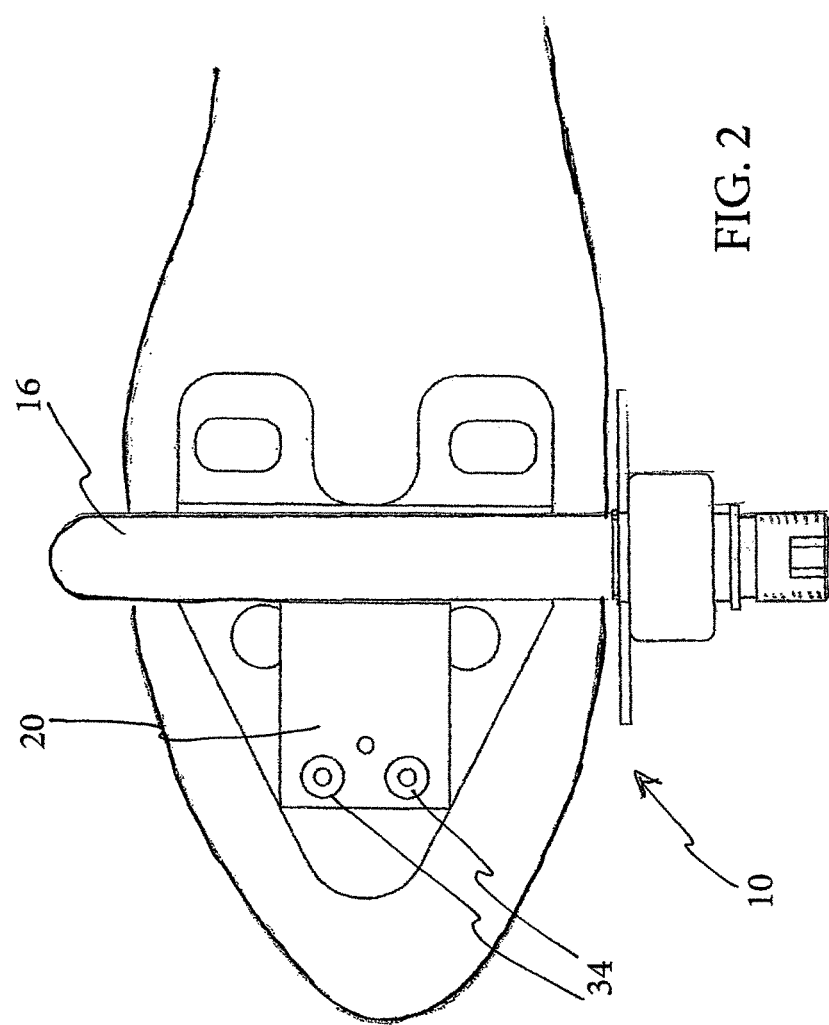
FIG. 2 is a bottom view of the system shown in FIG. 1.
Figure 3:
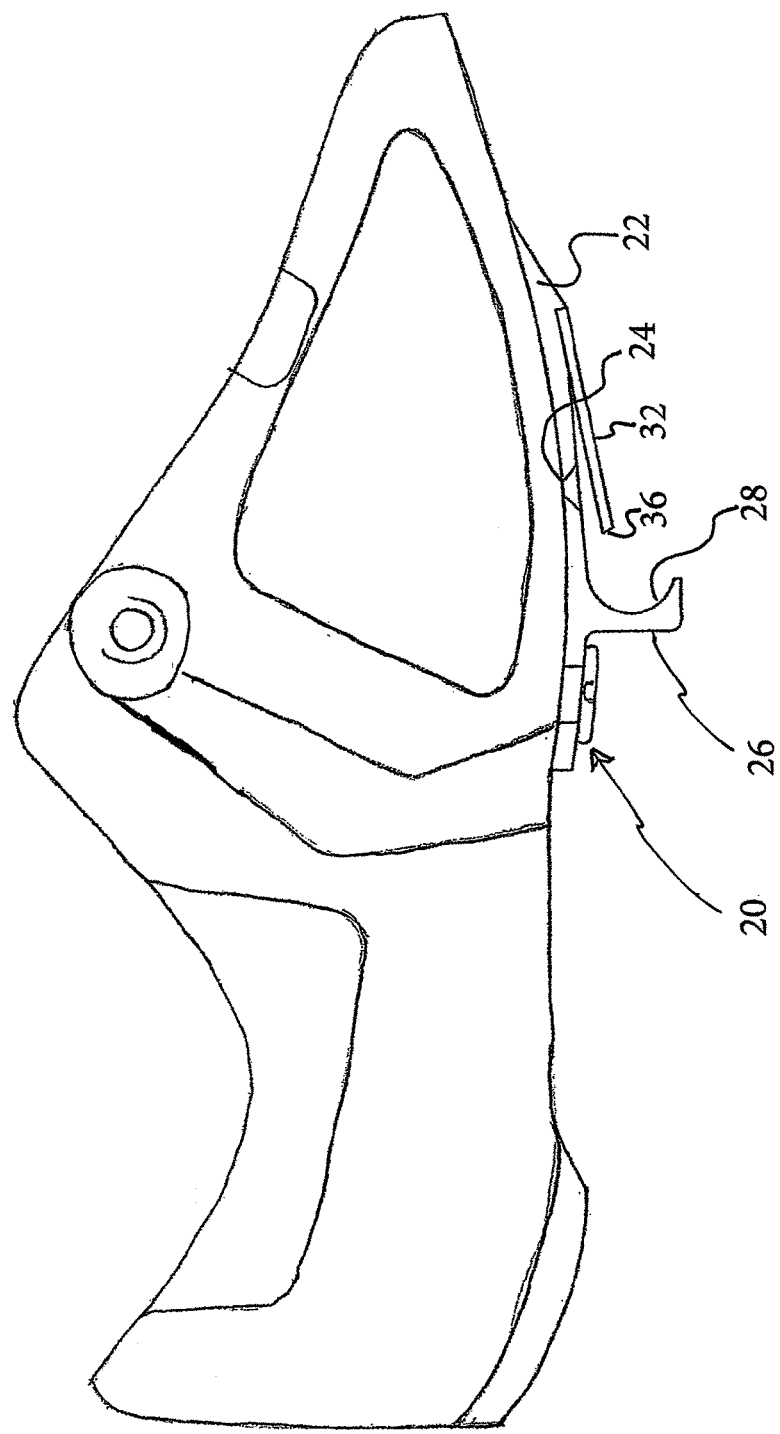
FIG. 3 is a side elevational view of the system shown in FIGS. 1 and 2 but with the sleeve removed.
Figure 4:
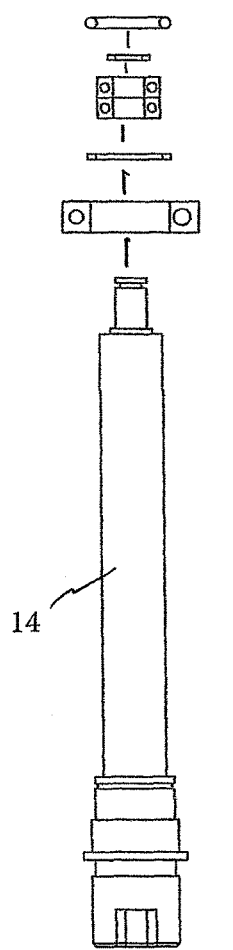
FIG. 4 is an exploded side elevational view of the shaft of FIGS. 1 and 2.
Figure 5:
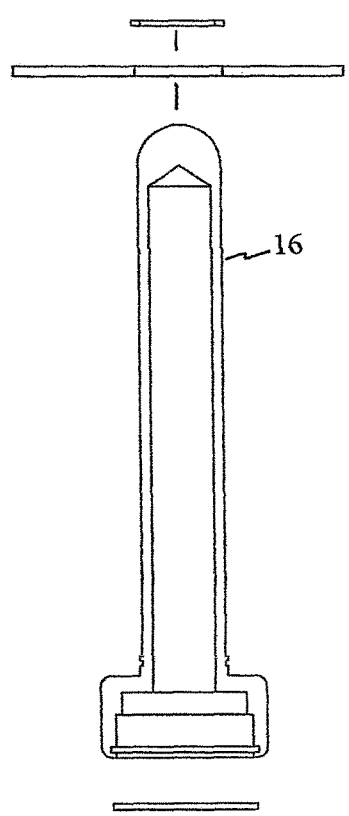
FIG. 5 is an exploded side elevational view of the shaft and sleeve of FIGS. 1 and 2.
Figure 6:
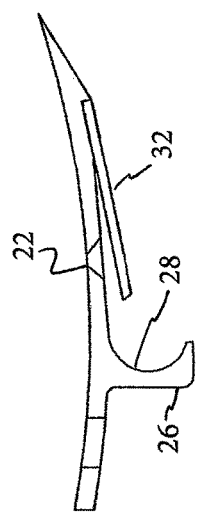
FIG. 6 is a side elevational view of the cleat of FIGS. 1-3.
Figure 7:
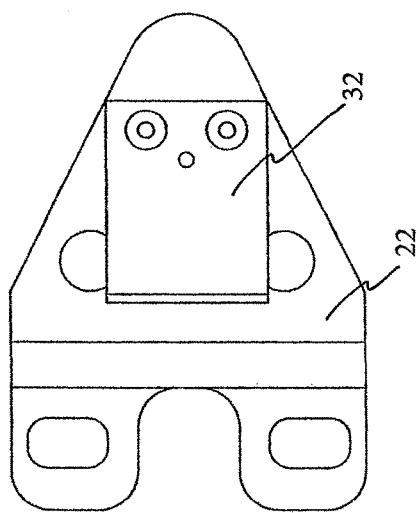
FIG. 7 is a bottom view of the cleat of FIGS. 1-3.
Figure 8:
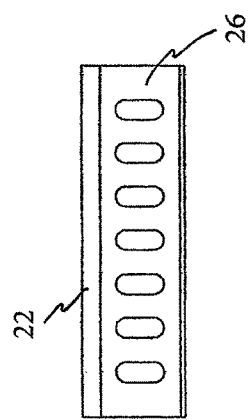
FIG. 8 is an end elevational view of the cleat of FIGS. 1-3.

With reference now to the drawings, and in particular to FIG. 1 thereof, the preferred embodiment of the new and improved bicycle shoe/pedal system embodying the principles and concepts of the present invention and generally designated by the reference numeral 10 will be described.

The present invention, the bicycle shoe/pedal system 10 is comprised of a plurality of components. Such components are individually configured and correlated with respect to each other so as to attain the desired objective. In their broadest context such include a shaft, a sleeve, a cleat and a securement tongue.

The bicycle shoe/pedal system 10 of the present invention is for use with a conventional bicycle and conventional bicycle shoes. The bicycle has a pedal assembly with two outwardly facing cranks. Each crank has an interior end rotatable about a common axis of rotation. Each crank has an exterior end with a horizontal threaded aperture. Each of the bicycle shoes has a toe end forwardly, a heel end rearwardly, an upper upwardly, and a sole downwardly. In the preferred embodiment of the bicycle shoe/pedal system, designated by reference numeral 10, first provided are two shafts 14. Each shaft has a generally cylindrical configuration. Each shaft has an inner end threadedly coupled to an associated threaded aperture of a crank. Each shaft has an outer free end.

Next provided are two sleeves 16. Each sleeve is generally cylindrical and slidably received on an associated shaft for rotation there around.

Next provided are two cleats 20. Each cleat has a base plate 22. Cleat bolts 24 attach each cleat to the lower surface of an associated sole adjacent to the toe end of one of the bicycle shoes. Each cleat has a projection 26 extending downwardly from the base plate. Each projection has a recess 28 in a generally C-shaped configuration with an opening facing forwardly. Each recess extends laterally to removably receive between 40 percent and 50 percent of an associated sleeve. Each cleat is fabricated of stainless steel.

Lastly, two securement tongues 32 are provided. Each securement tongue has a generally rectangular configuration with a leading end and a trailing end. Tongue bolts 34 attach each leading end to an associated base plate forwardly. Each trailing end is a free linear edge 36 extending rearwardly and upwardly to contact an upper half of an associated shaft in the recess during normal use while bicycling. An adjustment screw 38 is provided between the tongue and the base plate. Each securement tongue is fabricated of spring steel. Each free linear edge of the securement tongue is adapted to be deflected downwardly by an associated sleeve to allow the passage of the sleeve for coupling and uncoupling a shoe with respect to a bicycle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bicycle shoe/pedal system for use with a sleeve having a generally cylindrical configuration slidably received on a shaft for rotation there around, the system comprising:

a cleat having a base plate with cleat bolts for attaching the cleat to a shoe sole, the cleat having a projection extending downwardly, the projection having a recess in a generally C-shaped configuration with an opening facing forwardly adapted to removably receive the sleeve; and a securement tongue with a leading end and a trailing end, tongue bolts attaching the leading end to the base plate forwardly, the trailing end being a free linear edge extending rearwardly and upwardly to contact the shaft in the recess.

2. The system as set forth in claim 1 wherein the base plate and projection are fabricated of stainless steel.

3. The system as set forth in claim 1 wherein the tongue is fabricated of spring steel.

4. The system as set forth in claim 1 wherein the C-shaped recess receives between 40 percent and 50 percent of the sleeve.

5. The system as set forth in claim 1 wherein the free linear edge is adapted to contact a lower half of the sleeve.

6. A bicycle shoe/pedal system (10) for use with a conventional bicycle and conventional bicycle shoes, the bicycle having a pedal assembly with two outwardly facing cranks, each crank having an interior end rotatable about a common axis of rotation, each crank having an exterior end with a horizontal threaded aperture, the pedal assembly having two generally cylindrical sleeves (16) and two generally cylindrical shafts (14); the bicycle shoes each having a toe end forwardly and a heel end rearwardly and an upper upwardly and a sole downwardly, the system comprising, in combination:

two cleats (20), each of the two cleats having a base plate (22), cleat bolts (24) attaching the cleats to the lower surface of an associated sole adjacent to the toe end, each cleat having a projection (26) extending downwardly from the base plate, each projection having a recess (28) in a generally C-shaped configuration with an opening facing forwardly, each recess extending laterally to removably receive between 40 percent and 50 percent of an associated sleeve, each cleat being fabricated of stainless steel; and two securement tongues (32), each securement tongue having a generally rectangular configuration with a leading end and a trailing end, tongue bolts (34) attaching each leading end to an associated base plate forwardly, each trailing end being a free linear edge (36) extending rearwardly and upwardly to contact an upper half of an associated shaft in the recess during normal use while bicycling, an adjustment screw (38) between the tongue and the base plate, each securement tongues being fabricated of spring steel, each free linear edge of the securement tongue adapted to be deflected downwardly by an associated sleeve to allow the passage of the sleeve for coupling and uncoupling a shoe with respect to a bicycle.

\* \* \* \* \*